(12) United States Patent
Yoshimura et al.

(10) Patent No.: US 8,649,939 B2
(45) Date of Patent: Feb. 11, 2014

(54) EMBEDDED CONTROL DEVICE

(75) Inventors: Kentaro Yoshimura, Hitachi (JP);
Takeshi Fukuda, Hitachi (JP); Fumio Narisawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/578,099

(22) PCT Filed: Jan. 31, 2011

(86) PCT No.: PCT/JP2011/051850
§ 371 (c)(1),
(2), (4) Date: Aug. 9, 2012

(87) PCT Pub. No.: WO2011/102207
PCT Pub. Date: Aug. 25, 2011

(65) Prior Publication Data
US 2012/0303216 A1 Nov. 29, 2012

(30) Foreign Application Priority Data
Feb. 18, 2010 (JP) .................................. 2010-033876

(51) Int. Cl.
*G06F 7/00* (2006.01)
(52) U.S. Cl.
USPC .......................................................... 701/36
(58) Field of Classification Search
USPC ................................................ 701/1, 36, 48
See application file for complete search history.

(56) References Cited

U.S. PATENT DOCUMENTS

| 5,974,346 A | 10/1999 | Poledna |
| 2006/0212178 A1 | 9/2006 | Yoshimura et al. |

FOREIGN PATENT DOCUMENTS

| JP | 10-511484 | 11/1998 |
| JP | 2002-149421 | 5/2002 |
| JP | 2002-157131 A | 5/2002 |
| JP | 2003-131893 | 5/2003 |
| JP | 2003-256201 | 9/2003 |
| JP | 2006-257998 A | 9/2006 |

OTHER PUBLICATIONS

Machine Translation of JP 2002-149421, May 24, 2002.*
Japan Patent Office; Notice of Reasons for Rejection on application 2010-033876 mailed May 7, 2013; pp. 1-3.
PCT International Search Report and Written Opinion on application PCT/JP2011/051850 mailed Apr. 26, 2011; 5 pages.

* cited by examiner

*Primary Examiner* — Mary Cheung
*Assistant Examiner* — Anne Mazzara
(74) *Attorney, Agent, or Firm* — Foley & Lardner LLP

(57) ABSTRACT

There is provided an embedded control device having high real time performance and capable of securing data concurrency. The embedded control device according to the present invention includes disclosure data and stored data as control data to be disclosed to a data reference component. The embedded control device changes over a reference destination for the data reference component either to the disclosure data or to the stored data, depending on which of the execution priority of the data disclosing source component and the execution priority of the data reference component is higher.

12 Claims, 14 Drawing Sheets

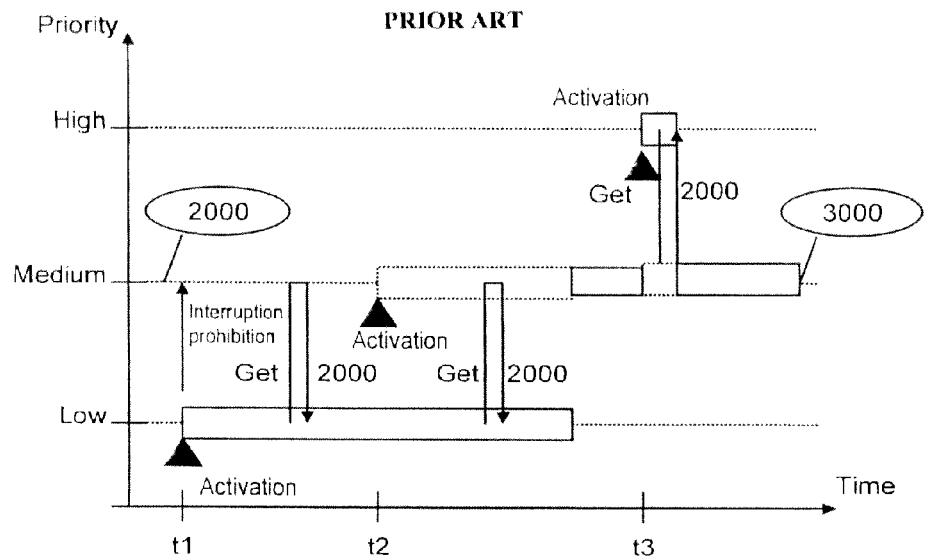
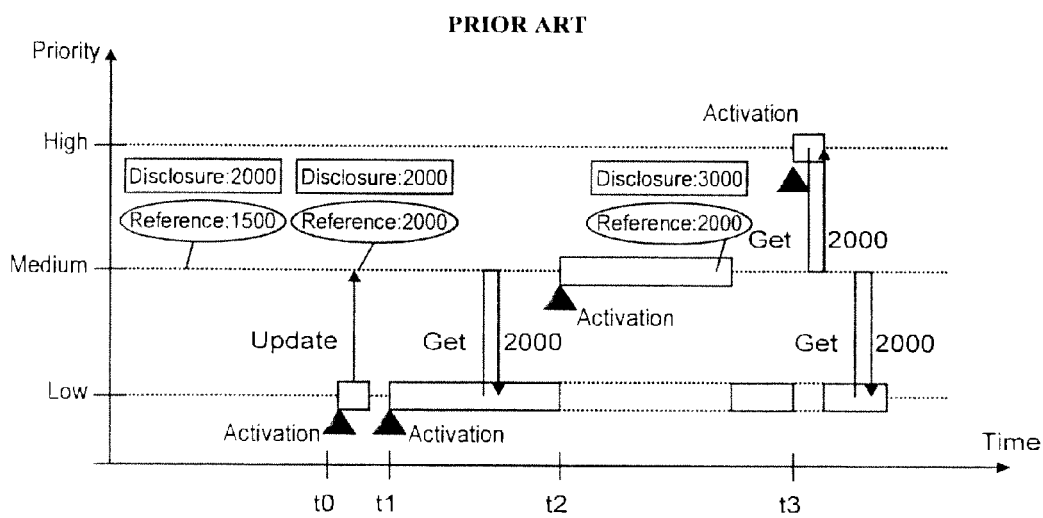

Fig. 10
| Task name | Activation trigger | Priority |
|---|---|---|
| Engine rotation synthesizing task | Engine rotation interruption | High |
| 1 ms priodical task | 1 ms priodical timer | Medium |
| 10 ms priodical task | 10 ms priodical timer | Low |
3221
Fig. 11
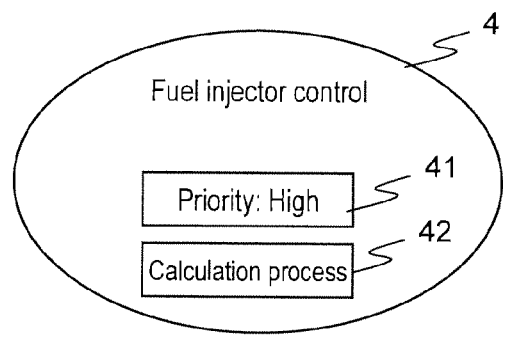
Fig. 12
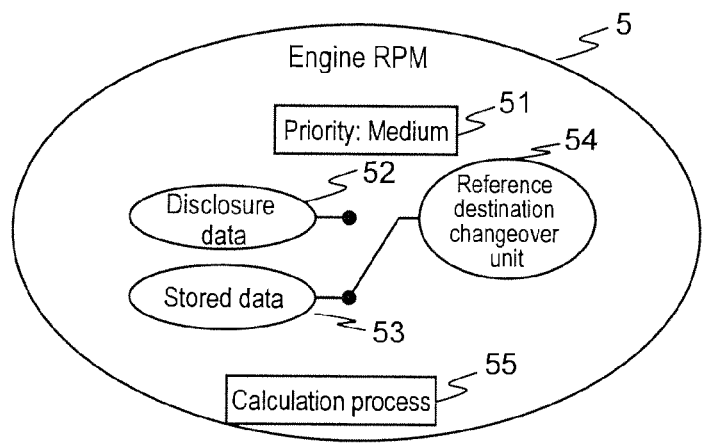

EMBEDDED CONTROL DEVICE

TECHNICAL FIELD

The present invention relates to an embedded control device.

BACKGROUND ART

In technical fields such as automobiles, elevators and construction machinery, an embedded control device is used to control a control target through so-called embedded software. Embedded software has advantages of realizing flexible and advanced control compared to a conventional scheme using a conventional mechanical mechanism or an electric circuit, and developing variety of secondary products by partially modifying the software.

As an embedded control device, for example, a vehicle control device is required to support various vehicle types such as a light automobile, a compact automobile, a luxury automobile, a minivan and a sports car, or to conform to regulations of each delivery destination or to satisfy customers' preferences, which causes increase of the number of variations of software. To meet these requirements, an object-oriented development scheme or a component-oriented development scheme is employed to create software components, and develop and/or reuse software on the component basis.

So-called real time performance having capability of completing a calculation and executing a response within a predetermined time is required since such an embedded control device handles physical phenomena of a control target. For example, an engine controller as one example of a vehicle control device is required to start up a calculation process synchronizing with a rotation angle signal of an engine, and to complete an execution of an ignition control within a predetermined response time.

In order to realize the above-mentioned real time process, a preemption process based on the execution priority is introduced in an embedded control device. In a preemption process, for example, a process allowing a slower response time such as a thermometry is defined as a low priority process and a process requiring a quick response time such as an ignition control is defined as a high priority process, and a high priority process may interrupt in a low priority process during execution of the low priority process.

Meanwhile, in digital control logic commonly used in an embedded control device, it is an assumption that control data is supposed not to be changed while the control date is being referred to by a certain control process during execution of this control process.

For example, in the case of implementing a control designed by using an ordinary differential equation, the ordinary differential equation is discretized at a certain clock tick rate and converted into a difference equation, and then this converted difference equation is calculated on a microcontroller at a time period corresponding to the clock tick rate, so as to realize the designed control. At this time, the control logic has an assumption that a difference equation calculation is instantly completed. In reality, however, a certain time is required for a calculation on a microcontroller. For this reason, it is important to satisfy so-called data concurrency that control data being referred to during an execution of a certain control process is supposed not to be changed.

Patent Literature 1 discloses an example of an embedded control device including plural software components. In this embedded control device, if data reference component with low priority refers to control data of a data disclosing source component with high priority, a disable interruption instruction is issued to the data disclosing source component at the time of executing the data reference component, thereby securing data concurrency.

Patent Literature 2 discloses an example of an embedded control device providing conversion data different from control data calculated by a data disclosing source component. In this embedded control device, disclosure data of the data disclosing source component is converted in a data format in accordance with a request from a data reference component, and the data in this format is stored as converted data, thereby reducing load of a data conversion process.

CITATION LIST

Patent Literature

Patent Literature 1: JP Patent Publication (Kokai) No. 2002-157131A
Patent Literature 2: JP Patent Publication (Kokai) No. 2006-257998A

SUMMARY OF INVENTION

Technical Problem

The technique described in Patent Literature 1 cannot start up the process of the data disclosing source component with high priority until the process of the data reference component is completed, which is supposed to be handled as a lower priority component; consequently, real time performance becomes deteriorated.

In the technique described in Patent Literature 2, even if the data reference component has high execution priority, and there is no possibility of interruption in the process of the data disclosing source component, a data reference destination of the data reference component is set to the converted data. Consequently, when the data disclosing source component for calculating a sensor measurement value updates a latest value, this latest value cannot be reflected on the converted data until the data conversion process is completed, which hinders the latest measurement value from being referred to.

An object of the present invention, which has been made in order to solve the above-mentioned problems, is to provide an embedded control device having high real time performance and capable of securing data concurrency.

Solution to Problem

The embedded control device according to the present invention includes disclosure data and stored data as control data to be disclosed to a data reference component. The embedded control device changes over a reference destination for the data reference component either to the disclosure data or to the stored data, depending on which of the execution priority of the data disclosing source component and the execution priority of the data reference component is higher.

Advantageous Effects of Invention

The embedded control device according to the present invention changes over the control data to be referred to depending on the execution priority, thereby selectively using the control data for securing real time performance and the

BRIEF DESCRIPTION OF DRAWINGS

FIG. 3 is a drawing illustrating an operation state of each software component in an embedded control device in which a technique of Patent Literature 1 is applied to an example of FIG. 2.

FIG. 4 is a drawing illustrating an operation state of each software component in an embedded control device in which a technique of Patent Literature 2 is applied to the example of FIG. 2.

FIG. 10 is a drawing illustrating a configuration of a task table 3221.

FIG. 11 is a drawing illustrating a configuration of a fuel injector control software component 4 which is a part of an actuator controller 325.

FIG. 12 is a drawing illustrating a configuration of an engine RPM software component 5.

DESCRIPTION OF EMBODIMENTS

<First Embodiment: Basic Configuration>

Figure 1:
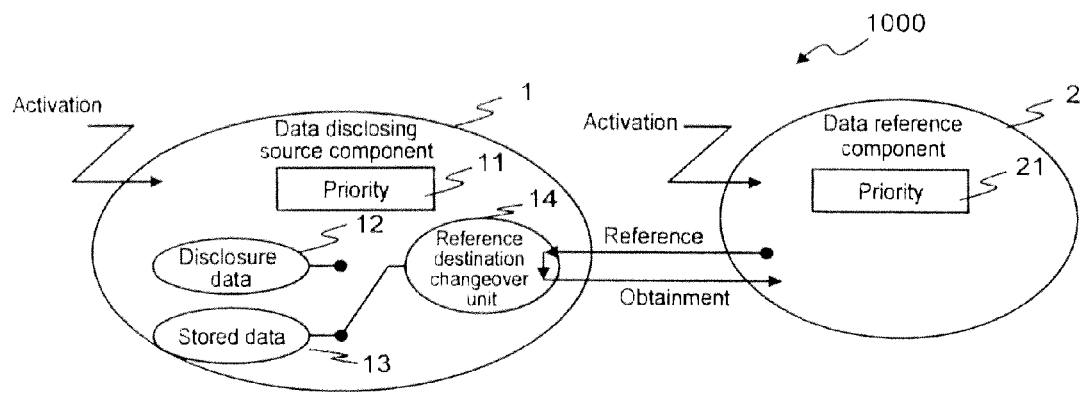
FIG. 1 is a functional block diagram of an embedded control device 1000 according to a first embodiment.

FIG. 1 is a functional diagram of the embedded control device 1000 according to a first embodiment of the present invention. The embedded control device 1000 includes a data disclosing source component 1 that is a software component for disclosing control data and a data reference component 2 that is a software component for referring to control data.

The data disclosing source component 1 includes priority information 11, disclosure data 12, stored data 13 and a reference destination changeover unit 14. The priority information 11 defines the execution priority of the data disclosing source component 1. The disclosure data 12 is control data for disclosure. The stored data 13 is internal control data to be referred to, substituting for the disclosure data 12 depending on the execution priority of the data reference component 2. The reference destination changeover unit 14 changes over a reference destination of control data in response to a reference request from the data reference component 2.

The data reference component 2 includes priority information 21 that defines the execution priority of the data reference component 2.

The reference destination changeover unit 14 compares the priority information 11 of the data disclosing source component 1 and the priority information 21 of the data reference component 2 in response to a reference request from the data reference component 2. If the priority information 11 of the data disclosing source component 1 is higher than the priority information 21 of the data reference component 2, that is, there is a possibility that the disclosure data 12 may be updated during the operation of the data reference component 2, the reference destination changeover unit 14 selects the stored data 13 as the control data to be returned to the data reference component 2, and return the value thereof. If the priority information 11 of the data disclosing source component 1 is equal to or less than the priority information 21 of the data reference component 2, that is, there is no possibility that the disclosure data 12 may be updated during the operation of the data reference component 2, the reference destination changeover unit 14 selects the disclosure data 12 as the control data to be returned to the data reference component 2, and returns the value thereof.

<First Embodiment: Operation Timing>

Hereinafter, descriptions will be provided on the operation timing of the embedded control device 1000. For the comparison, the operation timings of a general embedded control device and the above-mentioned Patent Literatures will be described, and thereafter the operation timing of the embedded control device 1000 will be described.

<First Embodiment: Operation Timing of General Embedded Control Device>

Figure 2:
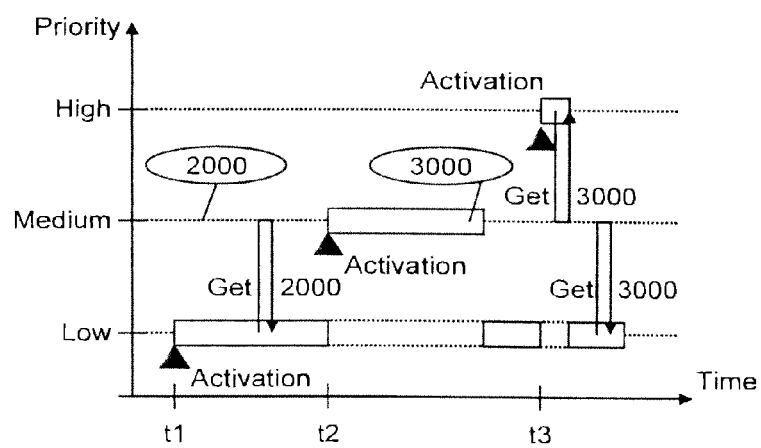
FIG. 2 is a drawing illustrating an operation timing of each software component in a conventional embedded control device.

FIG. 2 is a drawing illustrating the operation timing of software components included in a general embedded control device. In the embedded control device of FIG. 2, three software components operate at a low priority level, a medium priority level and a high priority level, respectively. The medium priority component is the data disclosing source component, and the low priority software component and the high priority software component are the data reference components, respectively. During its operation, the low priority software component refers to data retained by the medium priority software component plural times. Descriptions will now be provided on the operation at each time.

(FIG. 2: Time t1)

The medium priority software component has a value of "2000" of the control data at the time t1. At the time t1, the low priority software component is activated. The low priority software component refers to the control data of the medium priority software component so as to obtain the value of "2000."

(FIG. 2: Time t2)

At the time t2, the medium priority software component is activated, and the processing entity is changed over from the low priority software component to the medium priority software component. The medium priority software component calculates the control data so as to update the value to "3000." After the process of the medium priority software component is completed, the processing entity is changed over to the low priority software component.

(FIG. 2: Time t3)

At the time t3, the high priority software component is activated, and the processing entity is changed over from the low priority software component to the high priority software component. The high priority software component refers to the control data of the medium priority software component so as to obtain the value of "3000". After the process of the high priority software component is completed, the processing entity is changed over to the low priority software component. The low priority software component refers to the control data of the medium priority software component again, so as to obtain the value of "3000".

In the example of FIG. 2, during executing its operation, the low priority software component refers to the value retained by the medium priority software component plural times. The obtained values are, however, varied depending on the reference timing; thus there exists a problem that the concurrency of the control data is lost.

<First Embodiment: Operation Timing of Patent Literature 1>

FIG. 3 is a drawing illustrating an operation state of the software components in the embedded control device where the technique of Patent Literature 1 is applied to the example of FIG. 2. In the embedded control device of FIG. 3, three software components also operate at a low priority level, a medium priority level and a high priority level, respectively. Descriptions will now be provided on the operation at each time.

(FIG. 3: Time t1)

The medium priority software component has a value of "2000" of the control data at the time t1. At the time t1, the low priority software component is activated, and an interruption prohibition instruction is issued at the same time. The low priority software component refers to the control data of the medium priority software component so as to obtain the value of "2000."

(FIG. 3: Time t2)

At the time t2, the medium priority software component is activated, but becomes in a standby state because of the interruption prohibition state. The low priority software component refers to the control data of the medium priority software component again, so as to obtain the value of "2000." After the process of the low priority software component is completed, the interruption prohibition state is canceled, and the processing entity is changed over to the medium priority software component.

(FIG. 3: Time t3)

At the time t3, the high priority software component is activated, and the processing entity is changed over to the high priority software component. The high priority software component refers to the control data of the medium priority software component so as to obtain the value of "2000." After the process of the high priority software component is completed, the processing entity is changed over to the medium priority software component. The medium priority software component calculates the control data so as to update the value to "3000," and completes the process.

The example of FIG. 3 succeeds in securing the concurrency of the control data during the process of the low priority software component. Unfortunately, the medium priority software component supposed to be handled as a higher priority component than the low priority software component cannot be activated during the execution of the low priority software component, so that there still exists a problem of deteriorating the real time performance.

FIG. 4 is a drawing illustrating an operation state of the software components in the embedded control device where the technique of Patent Literature 2 is applied to the example of FIG. 2. In the embedded control device of FIG. 4, three software components also operate at a low priority level, a medium priority level and a high priority level, respectively. The medium priority software component includes disclosure data that is internal data of the medium priority software component, and reference data to be referred to by the other software components. Descriptions will now be provided on the operation at each time.

(FIG. 4: Before Time t0)

Before the time t0, the value of the disclosure data is "2000," and the value of the reference data is "1500."

(FIG. 4: Time t0)

At the time t0, the updating process of the reference data is executed so as to update its value to "2000."

(FIG. 4: Time t1)

At the time t1, the low priority software component is activated. The low priority software component refers to the control data of the medium priority software component so as to obtain the value of "2000" of the reference data.

(FIG. 4: Time t2)

At the time t2, the medium priority software component is activated, and the processing entity is changed over from the low priority software component to the medium priority software component. The medium priority software component calculates the control data so as to update the value of the disclosure data to "3000." After the process of the medium priority software component is completed, the processing entity is changed over to the low priority software component.

(FIG. 4: Time t3)

At the time t3, the high priority software component is activated, and the processing entity is changed over from the low priority software component to the high priority software component. The high priority software component refers to the control data of the medium priority software component so as to obtain the value of "2000" of the reference data. After the process of the high priority software component is completed, the processing entity is changed over to the low priority software component. The low priority software component refers to the control data of the medium priority software component again, so as to obtain the value of "2000" of the reference data.

The example of FIG. 4 succeeds in securing the concurrency of the control data during the process of the low priority software component, as well as in executing the process in accordance with the priority information defined for each software component. However, as is the case where the high priority software component refers to the data, a previous value before update is referred to although the value is already updated, depending on the timing of referring to the data, so that there still exists a problem of deteriorating the real time performance.

<First Embodiment: Reference Destination Changeover in First Embodiment>

Figure 5:
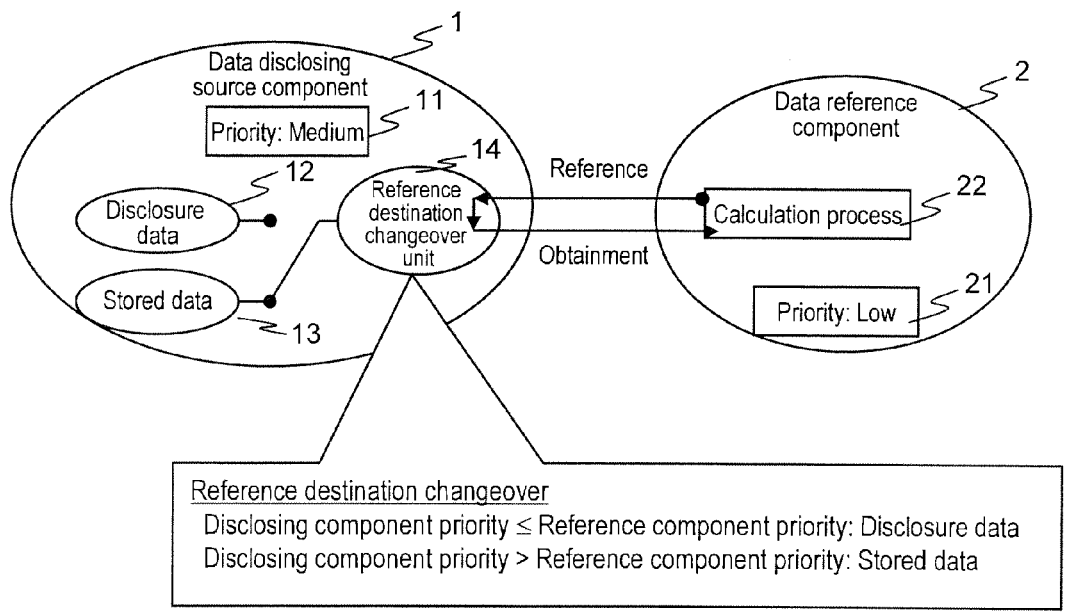
FIG. 5 is a drawing illustrating an operation of a reference destination changeover unit 14 to change over a reference destination to stored data 13.

FIG. 5 is a drawing illustrating the changeover operation of the reference destination changeover unit 14 to change over the reference destination to the stored data 13. The reference destination changeover unit 14 compares the execution priority of each software component in response to a data reference request from a calculation processing unit 22 of the data reference component 2. In the example of FIG. 5, the priority 11 of the data disclosing source component 1 is "medium" and the priority 21 of the data reference component 2 is "low," and the relation therebetween becomes "the priority of the data disclosing source component>the priority of the data reference component," and thus the reference destination of the control data is the stored data 13. The reference destination changeover unit 14 returns the value of the stored data 13 to the data reference component 2.

Figure 6:
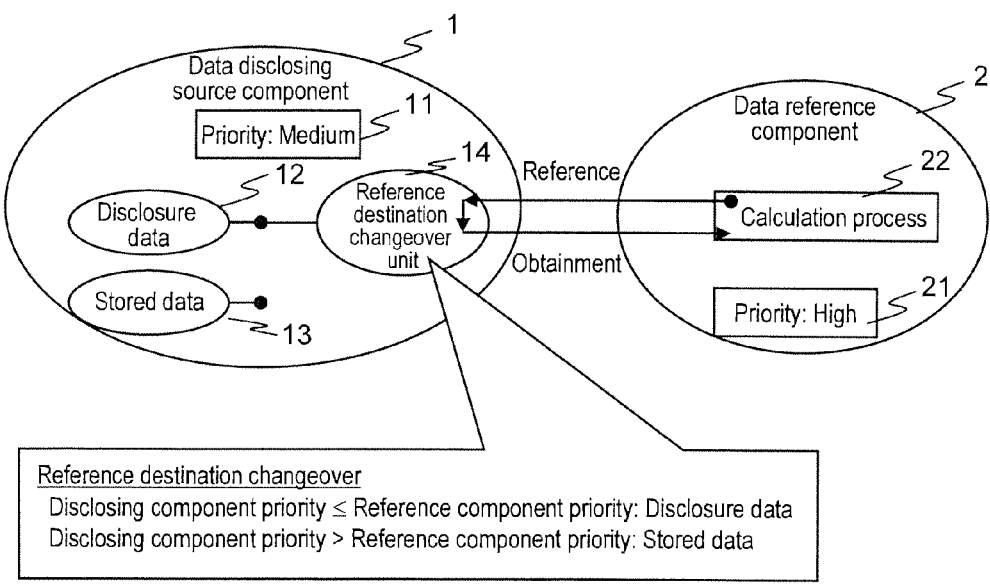
FIG. 6 is a drawing illustrating an operation of the reference destination changeover unit 14 to change over the reference destination to disclosure data 12.

FIG. 6 is a drawing illustrating the changeover operation of the reference destination changeover unit 14 to change over the reference destination to the disclosure data 12. The reference destination changeover unit 14 compares the execution priority of each software component in response to a data reference request from the calculation processing unit 22 of the data reference component 2. In the example of FIG. 6, the priority 11 of the data disclosing source component 1 is "medium" and the priority 21 of the data reference component 2 is "high," and the relation therebetween becomes "the priority of the data disclosing source component≤the priority of the data reference component," and thus the reference destination of the control data is the disclosure data 12. The reference destination changeover unit 14 returns the value of the disclosure data 12 to the data reference component 2.

<First Embodiment: Operation Timing in the First Embodiment>

Figure 7:
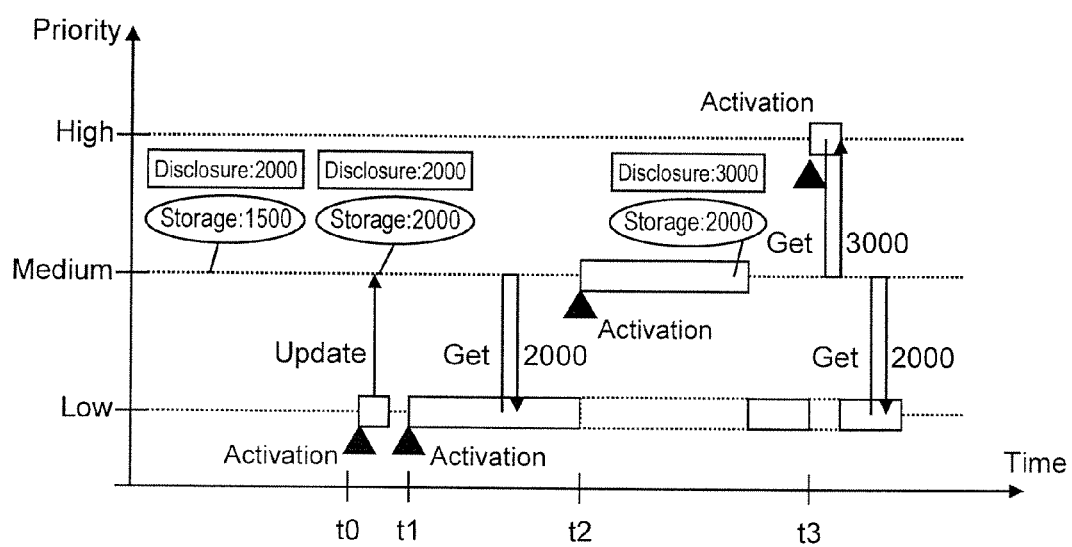
FIG. 7 is a drawing illustrating an operation state of each software component in an embedded control device in which a technique of the present invention is applied to the example of FIG. 2.

FIG. 7 is a drawing illustrating the operation state of the software components in the embedded control device 1000 where the technique of the present invention is applied to the example of FIG. 2. In the embedded control device of FIG. 7, three software components also operate at a low priority level, a medium priority level and a high priority level, respectively. The medium priority software component includes disclosure data and stored data that are the control data managed by the medium priority software component. Descriptions will now be provided on the operation at each time.

(FIG. 7: Before Time t0)

Before the time t0, the value of the disclosure data 12 is "2000," and the value of the stored data 13 is "1500."

(FIG. 7: Time t0)

At the time t0, the updating process of the stored data 13 is executed and its value is updated to "2000."

(FIG. 7: Time t1)

At the time t1, the low priority software component is activated. The low priority software component refers to the control data of the medium priority software component so as to obtain the value of "2000" that is the value of the stored data 13.

(FIG. 7: Time t2)

At the time t2, the medium priority software component is activated, and the processing entity is changed over from the low priority software component to the medium priority software component. The medium priority software component executes the calculation process of the control data so as to update the value of the disclosure data 12 to "3000." After the process of the medium priority software component is completed, the processing entity is changed over to the low priority software component.

(FIG. 7: Time t3)

At the time t3, the high priority software component is activated, and the processing entity is changed over from the low priority software component to the high priority software component. The high priority software component refers to the control data of the medium priority software component so as to obtain the value of "3000" that is the value of the disclosure data 12. After the process of the high priority software component is completed, the processing entity is changed over to the low priority software component. The low priority software component refers to the control data of the medium priority software component again, so as to obtain the value of "2000" that is the value of the stored data 13.

<First Embodiment: Conclusion>

As described above, in the first embodiment, the reference destination changeover unit 14 changes over the reference destination for the data reference component 2 either to the disclosure data 12 or to the stored data 13, depending on which of the execution priority 11 of the data disclosure source component 1 and the execution priority 21 of the data reference component 2 is higher. The disclosure data 12 is used in order to obtain the value after update in real time. The stored data 13 is used in order to secure the data concurrency for maintaining the same value in the process from the start to the end. Selectively using these pieces of data enables preservation of the concurrency of the control data as well as enhancement of the real time performance.

In the first embodiment, the reference destination changeover unit 14 returns the latest control data retained in the disclosure data 12 if the data reference component 2 with higher execution priority refers to the control data, that is, if there is no possibility of occurrence of the data concurrency problem. The reference destination changeover unit 14 returns the stored data 13 for guaranteeing the concurrency if the data reference component 2 with lower execution priority refers to the control data, that is, there is a possibility of occurrence of the data concurrency problem. Accordingly, it is possible to provide the real time performance of the control data for the data reference component 2 with higher execution priority, and also to provide the data concurrency for the data reference component 2 with lower execution priority.

In the first embodiment, the disclosure data 12 obtained by the data reference component 2 with high priority is sometimes different from the stored data 13 obtained by the data reference component 2 with low priority. In this case, the data reference component 2 with low priority has less importance for executing the process, and is not always required to update the data value in real time. Hence, it is rather preferable to provide a guarantee that the value will not be changed from the start to the end of the process than update of the value immediately. For this reason, it is configured to return the stored data 13 to the data reference component 2 with low priority.

<Second Embodiment>

In a second embodiment of the present invention, descriptions will be provided on the specific examples of the data disclosing source component 1 and the data reference component 2 that have been described in the first embodiment. The configuration of a vehicle control device 2000 will be explained as a specific example of the embedded control device 1000 as well.

Figure 8:
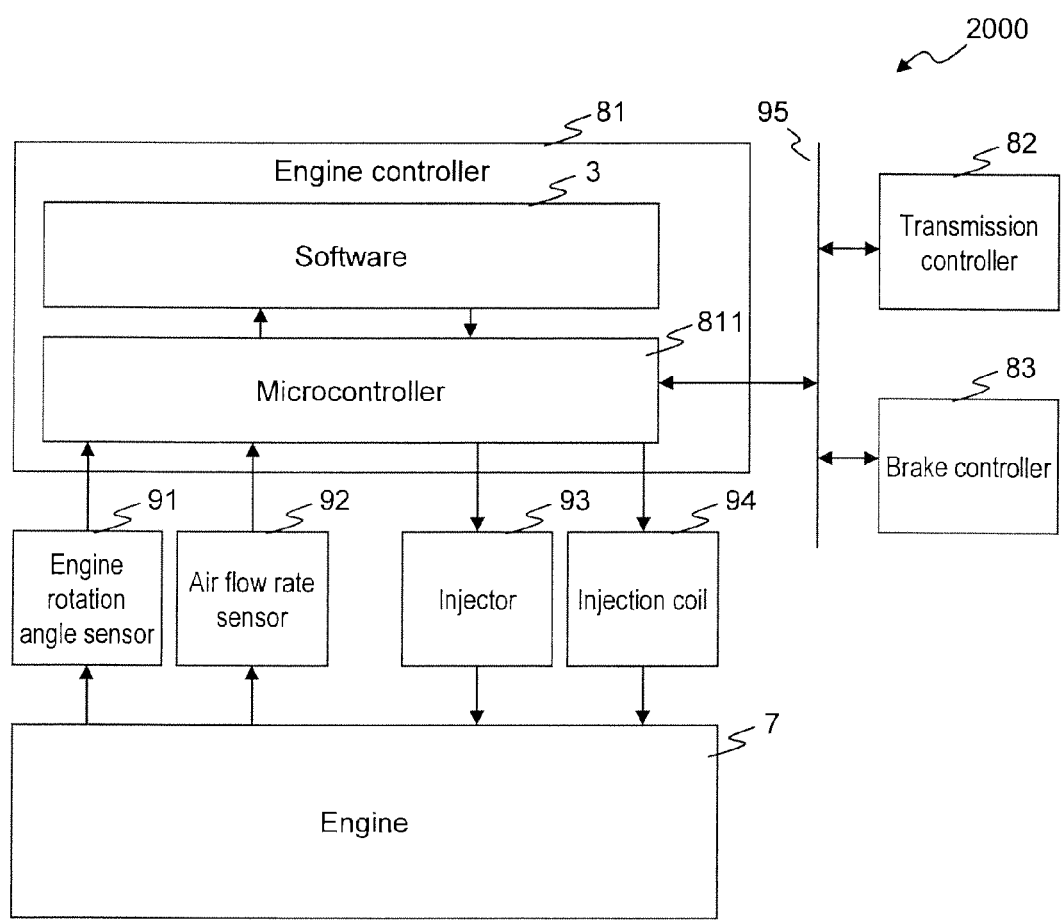
FIG. 8 illustrates a configuration example of a vehicle control device 2000 according to a second embodiment.

FIG. 8 illustrates a configuration example of the vehicle control device 2000 according to the second embodiment.

The vehicle control device 2000 as illustrated in FIG. 8 includes an engine 7, an engine controller 81, an engine rotation angle sensor 91, an air flow rate sensor 92, an injector 93, an ignition coil 94, a communication network bus 95, a transmission controller 82 and a brake controller 83.

The engine controller 81 includes a microcontroller 811 and software 3 operating on this microcontroller.

Figure 9:
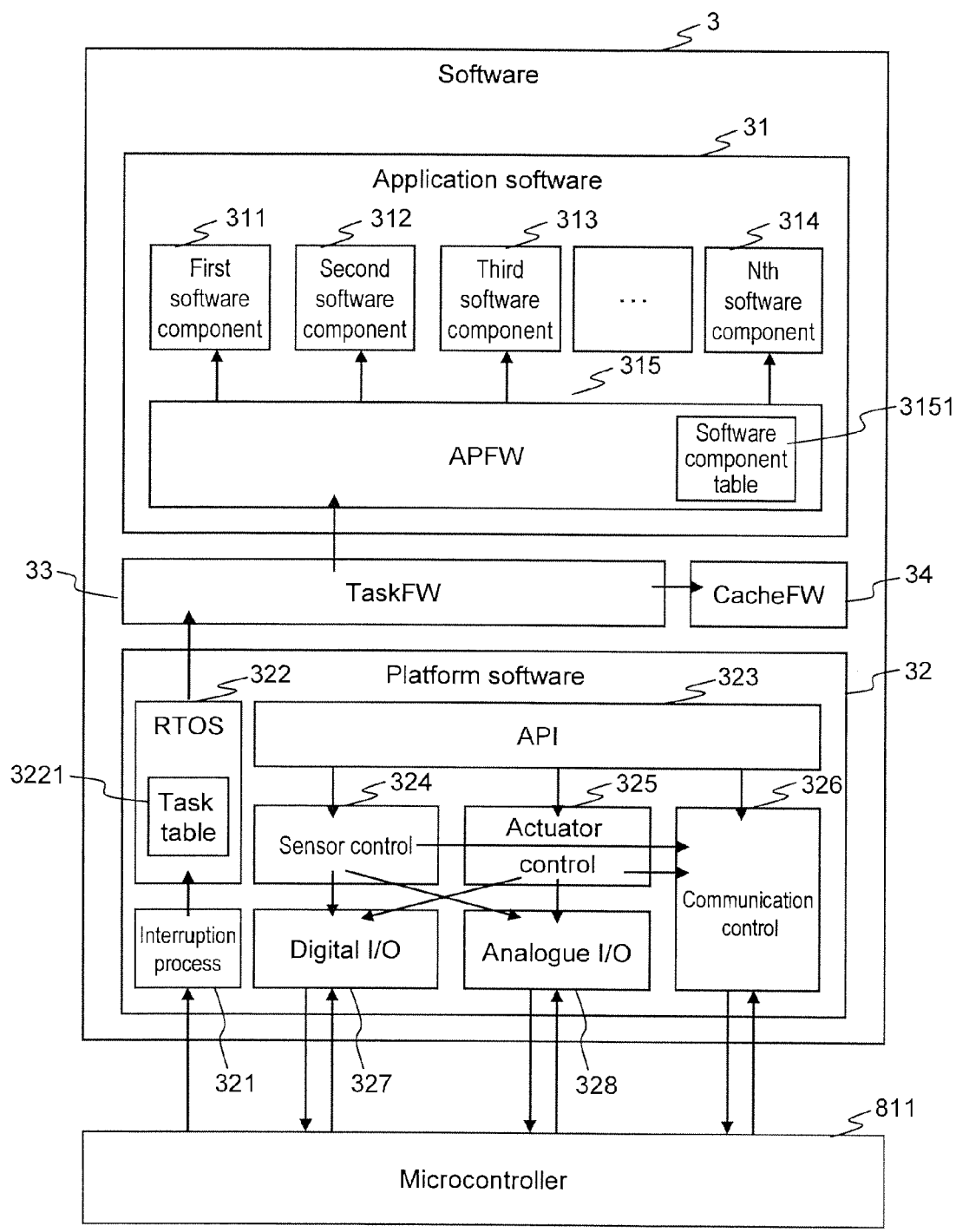
FIG. 9 is a drawing illustrating a configuration of software 3.

FIG. 9 is a drawing illustrating the configuration of the software 3. The software 3 includes application software 31, platform software 32, TaskFW(Task FrameWork) 33, and CacheFW(Cache FrameWork) 34. The Task FW33 controls an execution flow in a task activated by RTOS 322. A task denotes a process unit into which processes of at least one software component are grouped. An execution example of the task will be described later in FIG. 14 and thereafter. The CacheFW 34 updates the stored data retained by the software components 311 to 314.

The application software 31 includes a first software component 311, a second software component 312, a third software component 313, an Nth software component 314 and an APFW (Application FrameWork) 315. The APFW 315 controls an execution flow of each software component. The APFW 315 includes a software component table 3151 that defines the execution order of each software component.

The platform software 32 includes an interruption processing unit 321, a real time operating system (RTOS) 322, an application interface (API) 323, a sensor controller 324, an actuator controller 325, a communication controller 326, a digital I/O controller 327 and an analogue I/O unit 328. The RTOS 322 includes a task table 3221 that defines a task name, an activation trigger, and priority information.

FIG. 10 is a drawing illustrating the configuration of the task table 3221. An engine rotation synchronization task is triggered and activated by engine rotation interruption, and the software component executed in this task has high priority. A 1 ms periodical task is triggered and activated by a 1 ms periodical timer, and the software component executed in this task has medium priority. A 10 ms task is triggered and activated by a 10 ms periodical timer, and the software component executed in this task has low priority. The RTOS 322 sets a value of the priority information of each software component in accordance with the priority defined in the task table 3221.

FIG. 11 is a drawing illustrating the configuration of a fuel injector control software component 4, which is a part of the actuator controller 325. The fuel injector control software component 4 includes a priority definition unit 41 and a calculation processing unit 42. The fuel injector control software component 4 is executed in the engine rotation synchronization task, and the priority definition unit 41 is set to "high" priority. The calculation processing unit 42 executes the fuel injector control process.

FIG. 12 is a drawing illustrating the configuration of an engine RPM software component 5. The engine RPM software component 5 is any one of the first software component 311 to the Nth software component 314. The engine RPM software component 5 includes a priority definition unit 51, disclosure data 52, stored data 53, a reference destination changeover unit 54 and a calculation processing unit 55. The engine RPM software component 5 is executed in the 1 ms periodical task, and the priority definition unit 51 is set to "medium" priority. The calculation processing unit 55 executes an algorithm for calculating the engine RPM that is the control data, and updates the disclosure data 52.

Figure 13:
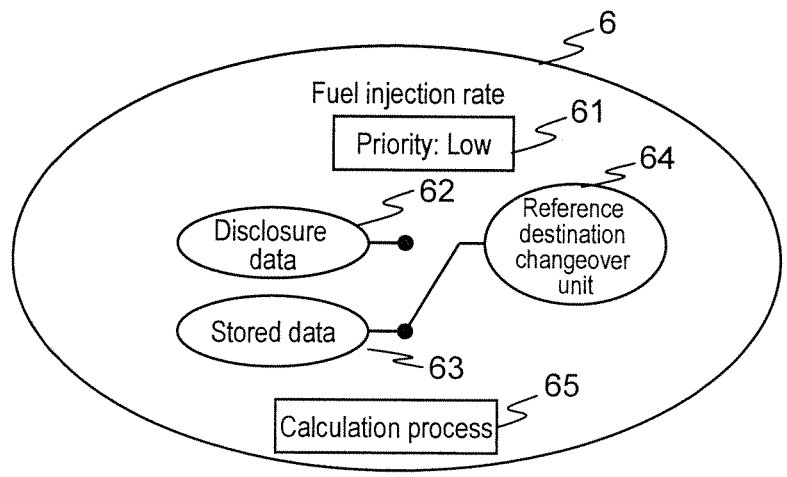
FIG. 13 is a drawing illustrating a configuration of a fuel injection rate software component 6.

FIG. 13 is a drawing illustrating the configuration of a fuel injection rate software component 6. The fuel injection rate software component 6 is any one of the first software component 311 to the Nth software component 314. The fuel injection rate software component 6 includes a priority definition unit 61, disclosure data 62, stored data 63, a reference destination changeover unit 64 and a calculation processing unit 65. The fuel injection rate software component 6 is executed in the 10 ms periodical task, and the priority definition unit 61 is set to "low" priority. The calculation processing unit 65 executes an algorithm for calculating the fuel injection rate that is the control data, and updates the disclosure data 62.

As described above, the configuration of the vehicle control device 2000 has been explained. The "stored data update unit" in the second embodiment corresponds to the CacheFW 34. The "disclosure data update unit" corresponds to each software component retaining each piece of disclosure data.

Descriptions will be provided on the operation of each software component included in the vehicle control device 2000. In the following description, each software component and the FW are sometimes explained as the operating entity for the purpose of simplicity of the explanation, but the operations specified by each software component and the FW are actually executed by a microcontroller 811. Only the operations of some of the software components will now be described, but the methods described in the second embodiment may also be applicable to other software components.

Figure 14:
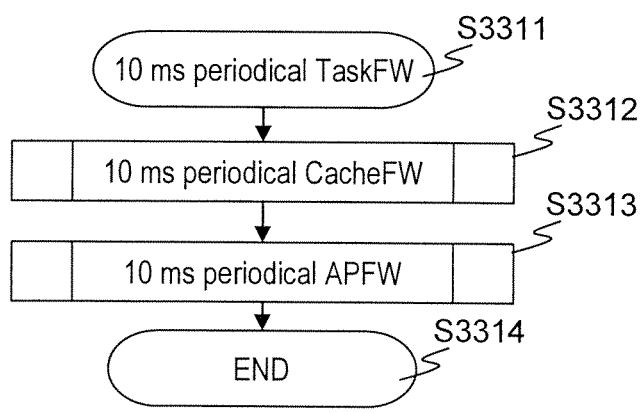
FIG. 14 is a drawing illustrating an execution flow of TaskFW 33 executed in a 10 ms periodical task.

FIG. 14 is a drawing illustrating an execution flow of the TaskFW 33 executed in the 10 ms periodical task. In Step S3311, the microcontroller 811 starts the process of the TaskFW 33 in the 10 ms periodical task. In Step S3312, the microcontroller 811 executes the process of the CacheFW 34 in the 10 ms periodical task. Detailed description for Step S3312 will be provided below in FIG. 15. In Step S3313, the microcontroller 811 executes the process of the APFW 315 in the 10 ms periodical task. In Step S3314, the microcontroller 811 completes the process of the TaskFW 33 in the 10 ms periodical task.

Figure 15:
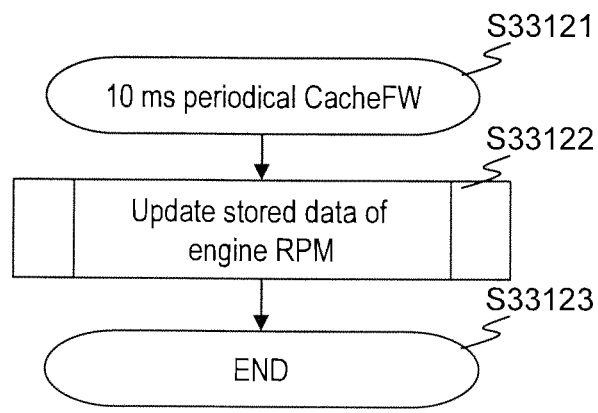
FIG. 15 is a drawing illustrating a detailed process of CacheFW 34 in Step 3312.

FIG. 15 is a drawing illustrating the detailed process of the CacheFW 34 in Step 3312. In Step S33121, the microcontroller 811 starts the process of the CacheFW 34 in the 10 ms periodical task. In Step S33122, the CacheFW 34 executes the process of updating the stored data 53 of the engine RPM software component 5. Detailed description for Step S33122 will be provided below in FIG. 18. In Step S33123, the microcontroller 811 completes the process of the CacheFW 34 in the 10 ms periodical task.

Figure 16:
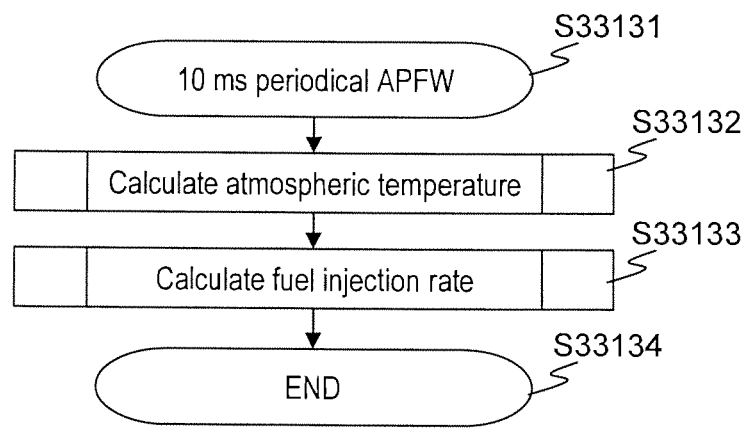
FIG. 16 is a drawing illustrating a detailed process of APFW 315 in Step S3313.

FIG. 16 is a drawing illustrating the detailed process of the APFW 315 in Step S3313. In Step S33131, the microcontroller 811 starts the process of the APFW 315 in the 10 ms periodical task. In Step S33132, the APFW 315 executes the calculation process of atmospheric temperature which is one of the control data. In Step S33133, the APFW 315 executes the calculation process of the fuel injection rate which is one of the control data. Detailed description for Step S33133 will be provided below in FIG. 17. In Step S33134, the microcontroller 811 completes the process of the APFW 315 in the 10 ms periodical task.

Figure 17:
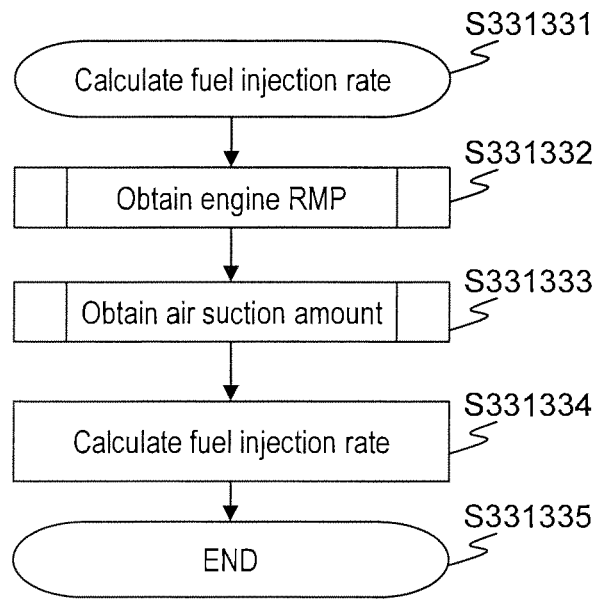
FIG. 17 is a drawing illustrating a detailed process of Step S33133.

FIG. 17 is a drawing illustrating the detailed process of Step S33133. In Step S331331, the APFW 315 starts the process of calculating the fuel injection rate. In Step S331332, the APFW 315 refers to the engine RPM which is one of the control data, and obtains the value thereof. The detailed description of Step S331332 will be provided below in FIG. 19. In Step S331333, the APFW 315 refers to an air suction amount which is one of the control data, and obtains the value thereof. In Step S331334, the APFW 315 calculates the fuel injection rate based on the values of the engine RPM and the air suction amount. In Step S331335, the APFW 315 completes the process in Step S33133.

Figure 18:
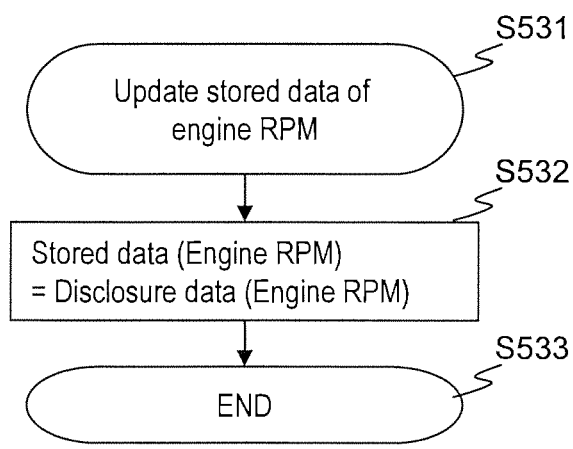
FIG. 18 is a drawing illustrating a process flow of CacheFW 34 to update stored data 53 of the engine RPM software component 5 in Step S33122.

In FIG. 18 is a drawing illustrating the process flow in which the CacheFW 34 updates the stored data 53 of the engine RPM software component 5 in Sep S33122. In Step S531, the CacheFW 34 starts the process of updating the engine RPM stored data. In Step S532, the CacheFW 34 substitutes the value of the disclosure data 52 for the stored data 53. In Step S533, the CacheFW 34 completes this process.

Figure 19:
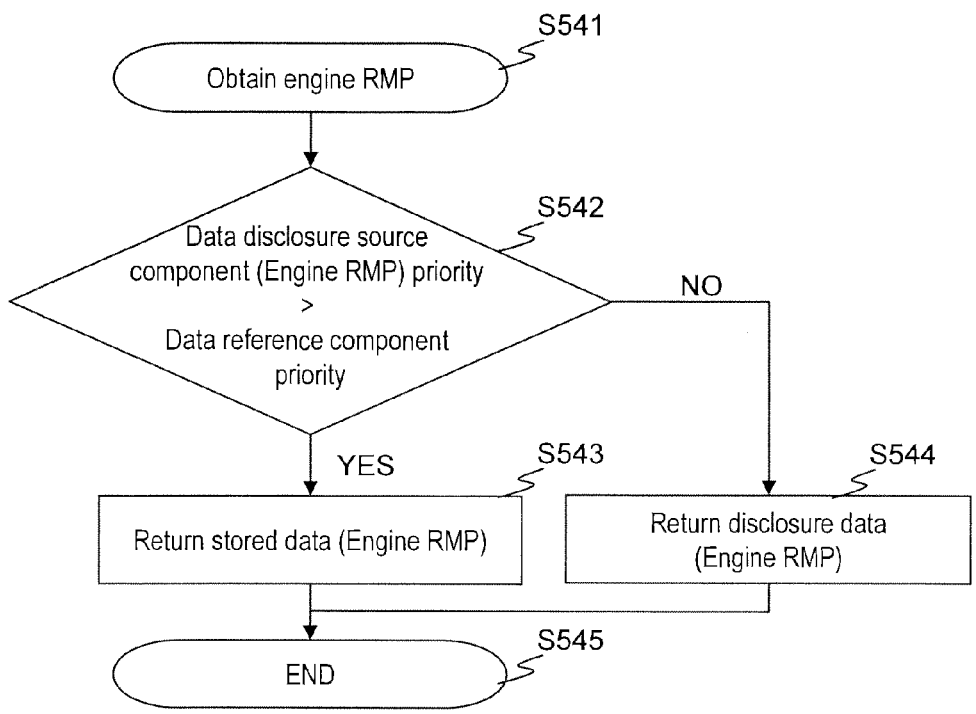
FIG. 19 is a drawing illustrating an operation of a reference destination changeover unit 54 in Step S331332.

FIG. 19 is a drawing of illustrating the operation of the reference destination changeover unit 54 in Step S331332. In Step S331332, the APFW 315 instructs the calculation processing unit 65 of the fuel injection rate software component 6 that is the data reference component to cause the engine RPM software component 5 to refer to the control data. Descriptions will now be provided on each step in FIG. 19.

In Step S541, the reference destination changeover unit 54 receives a control data reference request from the calculation processing unit 65 of the fuel injection rate software component 6, and starts this process flow. In Step S542, the reference destination changeover unit 54 compares the execution priority of the data disclosing source component to the execution priority of the data reference component. The priority 51 of the engine RPM software component 5 that is the data disclosing source component is "medium", and the priority 61 of the fuel injection rate software component 6 that is the data reference component is "low," and thus the relation therebetween becomes "the priority of the data disclosing source component >the priority of the data reference component." Therefore, the reference destination changeover unit 54 shifts to Step S543, and changes over the reference destination of the control data to the stored data 53, and returns the value of the stored data 53 to the fuel injection rate software component 6. On the other hand, if "the priority of the data disclosing source component <= the priority of the data reference component," the reference destination changeover unit 54 shifts to Step S544, and changes over the reference destination of the control data to the disclosure data 52, and returns the value of the disclosure data 52 to the fuel injection rate software component 6. In Step S545, the reference source changeover unit 54 completes this process.

Figure 20:
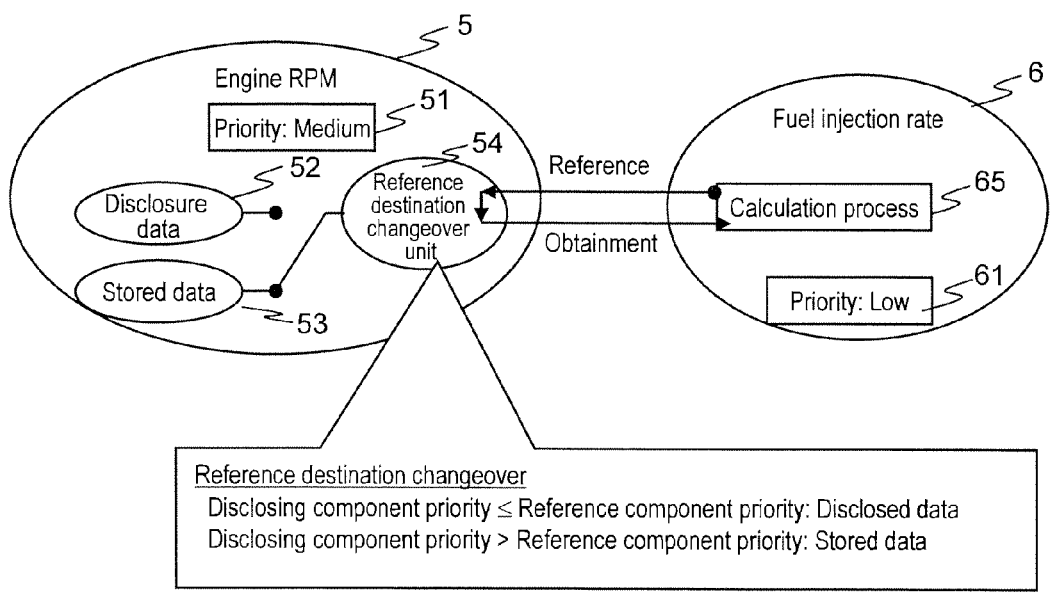
FIG. 20 is a drawing illustrating the operation of the reference destination changeover unit 54 in Step S331332.

FIG. 20 is a drawing illustrating the operation of the reference destination changeover unit 54 in Step S331332. When a data reference request is sent from the calculation processing unit 65 of the fuel injection rate software component 6 that is the data reference component, the reference destination changeover unit 54 executes the operation flow described in FIG. 19. The priority 51 of the engine RPM software component 5 that is the data disclosing source component is "medium," and the priority 61 of the fuel injection rate software component 6 that is the data reference component is "low," and thus the relation therebetween becomes "the priority of the data disclosing source component>the priority of the data reference component." Accordingly, the reference destination of the control data is the stored data 53.

Figure 21:
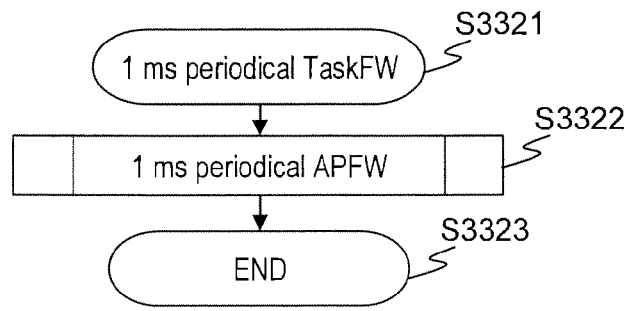
FIG. 21 is a drawing illustrating an execution flow of TaskFW 33 executed in a 1 ms periodical task.

FIG. 21 is a drawing illustrating the execution flow of the TaskFW 33 executed in the 1 ms periodical task. In Step S3321, the microcontroller 811 starts the process of the TaskFW33 in the 1 ms periodical task. In Step S3322, the microcontroller 811 executes the process of the APFW 315 in the 1 ms periodical task. In Step S3323, the microcontroller 811 completes the process of the TaskFW 33 in the 1 ms periodical task.

Figure 22:
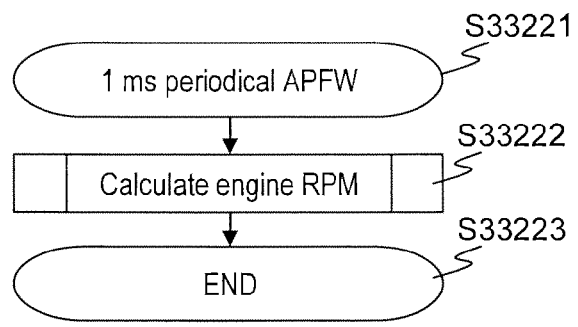
FIG. 22 is a drawing illustrating a detailed process of Step S3322.

FIG. 22 is a drawing illustrating the detailed process of Step S3322. In Step S33221, the APFW 315 starts the process of the APFW 315 of the 1 ms periodical task. In Step S33222, the APFW 315 activates the calculation process 55 of the engine RPM software component 5, and calculates the engine RPM which is one of the control data. In Step S33223, the APFW 315 completes the flow of this operation.

Figure 23:
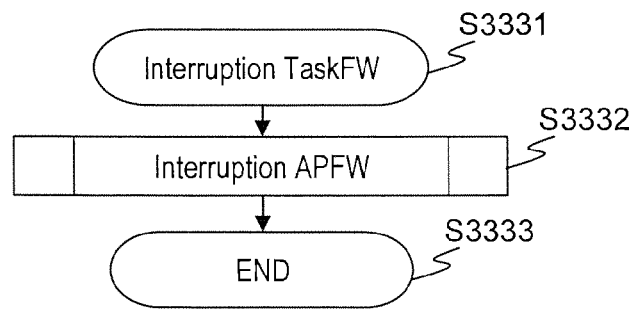
FIG. 23 is a drawing illustrating an execution flow of TaskFW 33 executed in an engine rotation interruption task.

FIG. 23 is a drawing illustrating the execution flow of the TaskFW 33 executed in an engine RPM interruption task. The interruption task refers to a task so triggered and activated by timer interruption, for example, as to interrupt another process during execution thereof. Descriptions will now be provided on each step of FIG. 23.

In Step S3331, the microcontroller 811 starts the process of the TaskFW 33 in the interruption task. In Step S3332, the microcontroller 811 executes the process of the APFW 315 in the interruption task. In Step S3333, the microcontroller 811 completes the process of the TaskFW 33 in the interruption task.

Figure 24:
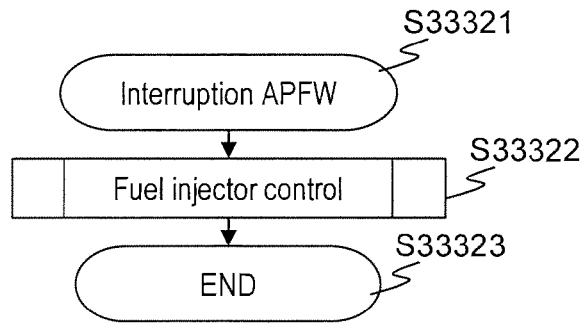
FIG. 24 is a drawing illustrating a detailed process of Step S3332.

FIG. 24 is a drawing illustrating the detailed process of Step S3332. In Step S33321, the APFW 315 starts the process of the APFW in the interruption task. In Step S33322, the APFW 315 executes the fuel injector control software component 4 which is one kind of the actuator controller 325, using the API 323 of the platform software 32. The details of Step S33322 will be described below in FIG. 25. In Step S33323, the APFW 315 completes the process of the APFW 315 in the interruption task.

Figure 25:
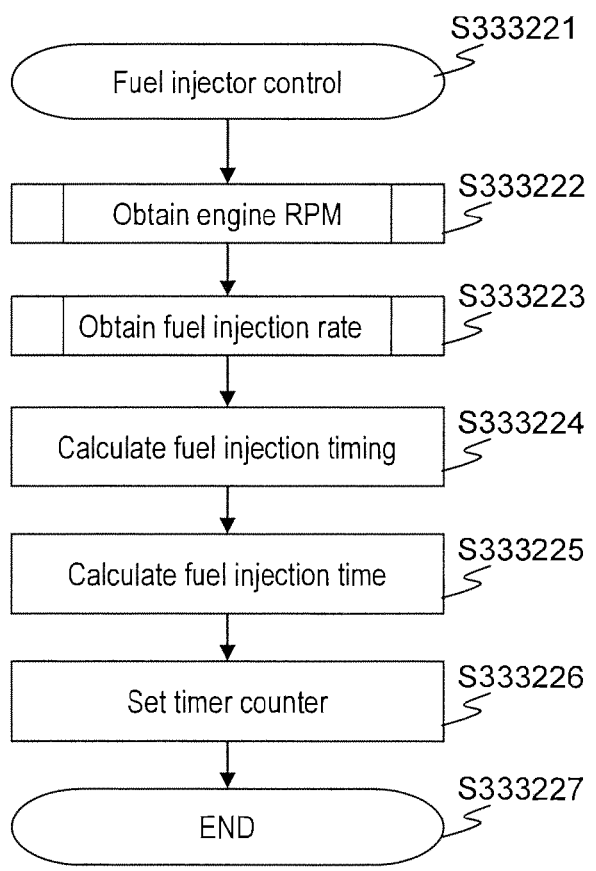
FIG. 25 is a drawing illustrating a detailed flow of Step S33322.

FIG. 25 is a drawing illustrating the detailed flow of Step S33322. In Step S333221, the fuel injector control software component 4 starts the operation. In Step S333222, the fuel injector control software component 4 refers to the engine RPM which is one of the control data, and obtains the value thereof. In Step S333223, the fuel injector control software component 4 refers to the fuel injection rate which is one of the control data, and obtains the value thereof In Step S333224, the fuel injector control software component 4 calculates the fuel injection timing. In Step S333225, the fuel injector control software component 4 calculates the fuel injection time. In Step S333226, the fuel injector control software component 4 sets the fuel injection timing and the fuel injection time to the timer of the microcontroller. In Step S333227, the fuel injector control software component 4 completes the process.

Figure 26:
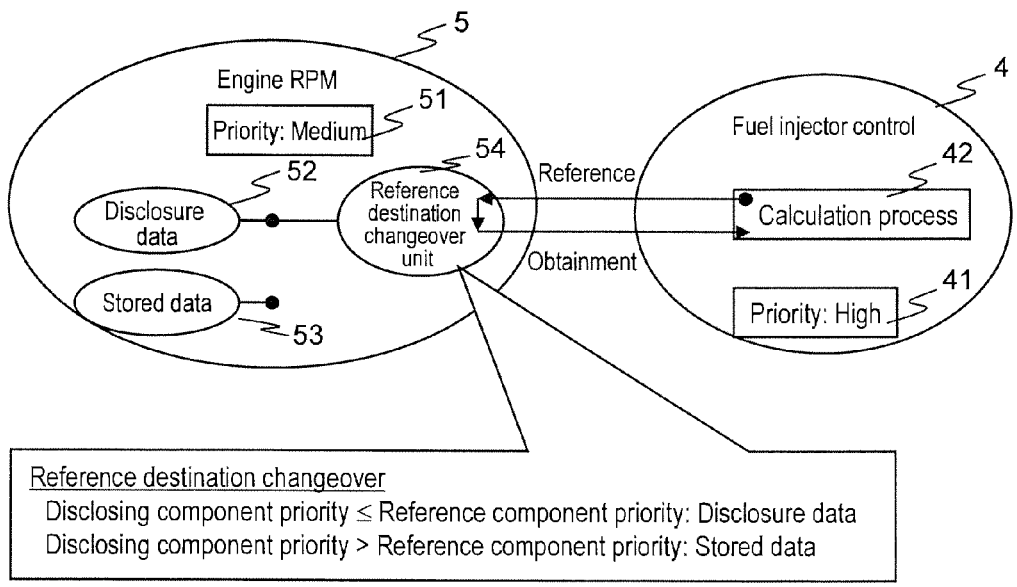
FIG. 26 is a drawing illustrating an operation of the reference destination changeover unit 54 in Step S333222.

FIG. 26 is a drawing illustrating the operation of the reference destination changeover unit 54 in Step S333222. The reference destination changeover unit 54 executes the process as described in FIG. 19, in response to the data reference request from the calculation processing unit 42 of the fuel injector control software component 4 that is the data reference component. The priority 51 of the engine RPM software component 5 that is the data disclosing source component is "medium," and the priority 41 of the fuel injector control software component 4 that is the data reference component is "high," and thus the relation therebetween becomes "the priority of the data disclosing source component ≤the priority of the data reference component." Therefore, the reference destination of the control data is the disclosure data 52.

As described above, in the vehicle control device 200 according to the second embodiment, each software component retains the disclosure data and updates its own retaining disclosure data during its control calculation by itself. The CacheFW 34 is configured to be a different software component from each software component that executes the control calculation, has different priority, preferably lower priority than that of each software component, and updates the stored data retained by each software component by using the value of the disclosure data. Through such a configuration, the disclosure data disclosed to a high priority software component can be updated by each software component by itself, thereby securing the real time performance, and the stored data disclosed to a lower priority software component can be separately updated without interrupting the control calculation of each software component.

In the second embodiment, descriptions have been provided on the example in which the fuel injector control software component 4, which is a part of the actuator controller 325, refers to the engine RPM as the control data, but the fuel injector control software component 4 may be configured to refer to a sensor measurement value, or refer to other vehicle control parameters such as a vehicle status prediction value or a vehicle control target value. This is also applicable to other embodiments.

<Third Embodiment>

In the second embodiment, it has been described that the process of the CacheFW 34 to update the stored data is executed as a part of the 10 ms periodical task (low priority task). This process of the CacheFW 34 is executed with the same execution priority or at the same execution timing of the fuel injection rate software component 6 that is the data reference component. The process of the CacheFW 34 may also be activated by any timer interruption or any external interruption, for example.

For example, execution of such a particular process that "activates the CacheFW 34 with low priority in the 10 ms from now" during the process of software component or the FW may be reserved by setting timer execution. Besides this, such an interruption process that "activates the CacheFW 34 with low priority if the sensor measurement value exceeds a threshold value" may be executed by using an external trigger of the vehicle control device 2000, for example.

<Fourth Embodiment>

In the first to third embodiments, it has been described that the reference destination changeover unit included in each software component changes over the reference destination of the control data based on the execution priority of the data disclosing source component and the execution priority of the data reference component. Meanwhile, if the control data to which the data reference component refers is uniquely defined without depending on the execution priority of each software component, the reference destination changeover unit included in each software component may be configured to execute the changeover operation of the reference destination fixedly without depending on the execution priority.

For example, if the control data as the reference destination for the fuel injection rate software component 6 is fixed to the stored data 53 of the engine RPM software component 5, the reference destination changeover unit 54 may be configured to always return the value of the stored data 53 in response to a data reference request from the fuel injection rate software component 6.

Reference Signs List

1: Data disclosing source component, 11: Priority information, 12: Disclosure data, 13: Stored data, 14: Reference destination changeover unit, 2: Data reference component, 21: Priority information, 22: Calculation processing unit, 1000: Embedded control device, 3: Software, 31: Application software, 311 to 314: Software components, 315: APFW, 3151: Software component table, 32: Platform software, 321: Interruption processing unit, 322: Real time operating system, 3221: Task table, 323: Application interface, 324: Sensor controller, 325: Actuator controller, 326: Communication controller, 327: Digital I/O controller, 328: Analogue I/O unit, 33: TaskFW, 34: CacheFW, 4: Fuel injector control software component, 41: Priority definition unit, 42: Calculation processing unit, 5: Engine RPM software component, 51: Priority definition unit, 52: Disclosure data, 53: Stored dara, 54: Reference destination changeover unit, 55: Calculation processing unit, 6: Fuel injection rate software component, 61: Priority definition unit, 62: Disclosure data, 63: Stored data, 64: Reference destination changeover unit, 65: Calculation processing unit, 7: Engine, 81: Engine controller, 811: Microcontroller, 82: Transmission controller, 83: Brake controller, 91: Engine rotation angle sensor, 92: Air flow rate sensor, 93: Injector, 94: Injection coil, 95: Communication network bus, 2000: Vehicle control device

The invention claimed is:

1. An embedded control device comprising:
    control data used in control calculation for controlling a control target;
    a data disclosing source component that is a software component, configured to disclose the control data to another software component;
    a data reference component that is a software component, configured to refer to the control data; and
    a priority definition unit configured to define execution priority of each of the software components,
    the data disclosing source component including:
        disclosure data and stored data as the control data to be disclosed to the data reference component; and
        a reference destination changeover unit configured to change over a reference destination of the control data to which the data reference component refers either to the disclosure data or to the stored data, depending on which of the execution priority of the data disclosing source component and the execution priority of the data reference component is higher.

2. The embedded control device according to claim 1, wherein
    the reference destination changeover unit is configured to set the reference destination to the disclosure data if the execution priority of the data disclosing source component is equal to or less than the execution priority of the data reference component, and
    the reference destination changeover unit is configured to set the reference destination to the stored data if the execution priority of the data disclosing source component exceeds the execution priority of the data reference component.

3. The embedded control device according to claim 1, further comprising
    a disclosure data update unit configured to update the disclosure data with a same execution priority as that of the process of the data disclosing source component to calculate the control data.

4. The embedded control device according to claim 3, wherein
    the data disclosing source component is configured to update the disclosure data by executing a process of the data disclosure update unit in the process of calculating the control data.

5. The embedded control device according to claim 1, further comprising
    a stored data update unit configured to update the stored data with a different execution priority from that of the process of the data disclosing source component to calculate the control data.

6. The embedded control device according to claim 5, wherein
    the stored data update unit is configured to be a different software component from the data disclosing source component and the data reference component.

7. The embedded control device according to claim 5, wherein the stored data update unit is configured to update the stored data with a lower execution priority than that of the process of the data disclosing source component to calculate the control data.

8. The embedded control device according to claim 5, wherein
the stored data update unit is configured to update the stored data with a same execution priority as that of the data reference component if the execution priority of the data reference component is lower than that of the data disclosing source component.

9. The embedded control device according to claim 5, wherein
the stored data update unit is configured to update the stored data at a same timing as a timing in which the data reference component executes a process if the execution priority of the data reference component is lower than that of the data disclosing source component.

10. The embedded control device according to claim 9, wherein
the process of the stored data update unit to update the stored data is activated by timer interruption or external interruption.

11. The embedded control device according to claim 1, wherein
the reference destination changeover unit fixedly defines a correlation between the data reference component and the disclosure data or the stored data without depending on the execution priority.

12. The embedded control device according to claim 1, wherein
the control data is at least one of a sensor measurement value, an actuator control parameter, a vehicle state prediction value and a vehicle control target value, all of which are used for controlling a vehicle.

* * * * *